US012687446B2

(12) United States Patent
Nagasue et al.

(10) Patent No.: US 12,687,446 B2
(45) Date of Patent: Jul. 21, 2026

(54) INSPECTION DEVICE AND INSPECTION METHOD FOR LOAD DISTRIBUTION SENSOR

(71) Applicant: TOYOTA JIDOSHA KABUSHIKI KAISHA, Toyota (JP)

(72) Inventors: Junichi Nagasue, Nagakute (JP); Mitsugu Kikuchi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 353 days.

(21) Appl. No.: 18/617,710

(22) Filed: Mar. 27, 2024

(65) Prior Publication Data

US 2024/0426690 A1 Dec. 26, 2024

(30) Foreign Application Priority Data

Jun. 26, 2023 (JP) ................................. 2023-103935

(51) Int. Cl.
*G01L 25/00* (2006.01)
*G01L 1/12* (2006.01)

(52) U.S. Cl.
CPC .............. *G01L 25/00* (2013.01); *G01L 1/127* (2013.01)

(58) Field of Classification Search
CPC . G01L 25/00; G01L 1/14; G01L 1/127; G01L 1/12; A63B 22/0235; G01M 99/007
See application file for complete search history.

(56) References Cited

U.S. PATENT DOCUMENTS

| | | | | |
|---|---|---|---|---|
| 2009/0078059 A1 * | 3/2009 | Ogawa | ...................... | G01L 1/14 |
| | | | | 73/862.625 |
| 2010/0231207 A1 * | 9/2010 | Ogawa | ...................... | G01L 1/14 |
| | | | | 324/209 |

FOREIGN PATENT DOCUMENTS

| | | | | |
|---|---|---|---|---|
| JP | 3928976 B1 | 6/2007 | | |
| JP | 2009-063526 A | 3/2009 | | |
| JP | 2022163994 A | * 10/2022 | ............. | A63B 22/02 |

* cited by examiner

*Primary Examiner* — Thomas M Hammond, III
(74) *Attorney, Agent, or Firm* — Oliff PLC

(57) ABSTRACT

An inspection device according to an embodiment is for a load distribution sensor including driving-side loop electrodes disposed parallel to one another in a first surface, detection-side loop electrodes disposed parallel to one another in a direction orthogonal to the driving-side loop electrodes in a second surface lying parallel to the first surface, and a conductive sheet provided on the second surface through an intermediate layer that deforms according to a pressing force. The load distribution sensor drives either the driving-side loop electrodes or the detection-side loop electrodes and detects a signal due to electromagnetic coupling from the other electrodes. The inspection device includes a conductive member having a lower resistance value than the conductive sheet and disposed thereon to cover an electromagnetic coupling part between the driving-side loop and detection-side loop electrodes, and a detection unit that detects a signal due to electromagnetic coupling of the conductive member.

7 Claims, 3 Drawing Sheets

INSPECTION DEVICE AND INSPECTION METHOD FOR LOAD DISTRIBUTION SENSOR

CROSS-REFERENCE TO RELATED APPLICATION

This application claims priority to Japanese Patent Application No. 2023-103935 filed on Jun. 26, 2023, incorporated herein by reference in its entirety.

BACKGROUND

1. Technical Field

The present disclosure relates to an inspection device and an inspection method for a load distribution sensor.

2. Description of Related Art

Japanese Unexamined Patent Application Publication No. 2009-63526 (JP 2009-63526 A) discloses a pressure distribution detection device that uses a change in the degree of electromagnetic coupling due to a pressure exerted on a detection surface. This pressure distribution detection device includes pluralities of driving-side loop wires and detection-side loop wires that are respectively disposed on opposite surfaces of a substrate, and a cushion material and a conductive sheet that are provided in this order on the detection-side loop wires. The driving-side loop wires and the detection-side loop wires are configured to be respectively electromagnetically coupled together. A pressure distribution is detected by detecting a change in the degree of this electromagnetic coupling.

SUMMARY

One of failure modes of such electromagnetic-induction load distribution sensors is fatigue fracture of the conductive sheet. When inspecting the conductive sheet for a site of such fracture, visual detection is difficult due to a protective plate being provided on the conductive sheet over substantially an entire surface thereof.

Another problem is that, because such a load sensor generally has a large detection surface, conducting an inspection based on a change in a load value by applying a load to a load distribution sensor sequentially from one end takes an enormous amount of time. Moreover, a site of fracture in the conductive sheet due to fatigue fracture is minute and therefore a change in the load value is small, which makes it difficult to find the site with accuracy.

The present disclosure has been devised in view of such problems, and an object of the present disclosure is to provide an inspection device and an inspection method for a load distribution sensor that can conduct an inspection simply and accurately even when a site of fracture in the conductive sheet is minute.

An inspection device for a load distribution sensor according to a first aspect of the present disclosure is an inspection device for a load distribution sensor including a plurality of first loop electrodes that is disposed parallel to one another in a first surface, a plurality of second loop electrodes that is disposed parallel to one another in a direction orthogonal to the first loop electrodes in a second surface lying above the first surface and parallel to the first surface, and a conductive sheet that is provided on the second surface through an intermediate layer that deforms according to a pressing force. The load distribution sensor is configured to drive either the first loop electrodes or the second loop electrodes and detect a signal due to electromagnetic coupling from the other electrodes. The inspection device includes a conductive member that has a lower resistance value than the conductive sheet and is disposed on the conductive sheet so as to cover an electromagnetic coupling part between the first loop electrodes and the second loop electrodes, and a detection unit that detects a signal due to electromagnetic coupling of the conductive member.

In an inspection device for a load distribution sensor according to a second aspect of the present disclosure, the conductive member covers the conductive sheet over a predetermined area.

In an inspection device for a load distribution sensor according to a third aspect of the present disclosure, the conductive member is a conductive member having an area substantially equal to or smaller than a measurement field of the load distribution sensor that is demarcated by the first loop electrodes and the second loop electrodes.

In an inspection device for a load distribution sensor according to a fourth aspect of the present disclosure, the conductive member is a conductive member having an area smaller than a measurement field of the load distribution sensor that is demarcated by the first loop electrodes and the second loop electrodes. The inspection device further includes a moving mechanism that slides the conductive member over the measurement field.

In an inspection device for a load distribution sensor according to a fifth aspect of the present disclosure, the conductive member is made of the same material as the conductive sheet and thicker than the conductive sheet.

In an inspection device for a load distribution sensor according to a sixth aspect of the present disclosure, the conductive member is made of a material having a lower resistance value than the conductive sheet.

An inspection method for a load distribution sensor according to a seventh aspect of the present disclosure is an inspection method for a load distribution sensor including a plurality of first loop electrodes that is disposed parallel to one another in a first surface, a plurality of second loop electrodes that is disposed parallel to one another in a direction orthogonal to the first loop electrodes in a second surface lying above the first surface and parallel to the first surface, and a conductive sheet that is provided on the second surface through an intermediate layer that deforms according to a pressing force. The load distribution sensor is configured to drive either the first loop electrodes or the second loop electrodes and detect a signal due to electromagnetic coupling from the other electrodes. The inspection method includes the steps of disposing a conductive member having a lower resistance value than the conductive sheet onto the conductive sheet so as to cover an electromagnetic coupling part between the first loop electrodes and the second loop electrodes, and detecting a signal due to electromagnetic coupling of the conductive member.

The present disclosure makes it possible to conduct an inspection simply and accurately even when a site of fracture in a conductive sheet is minute.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
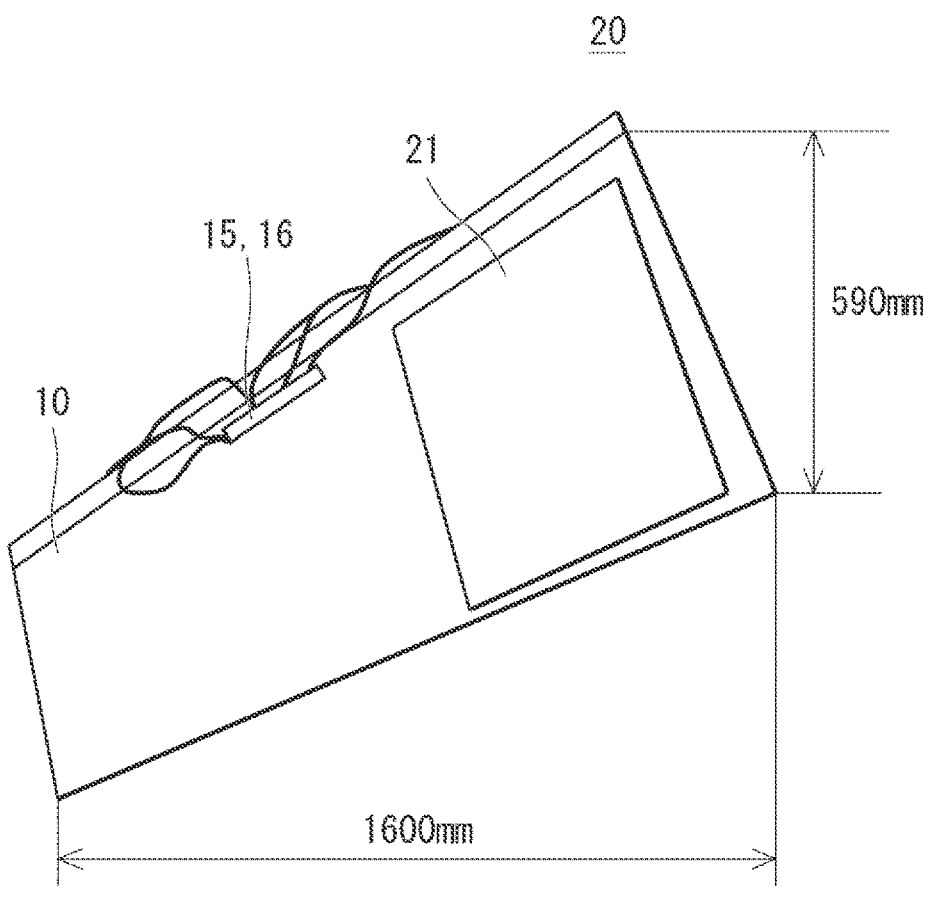
FIG. 1 is a view illustrating an inspection device for a load distribution sensor according to an embodiment.

An embodiment of the present disclosure will be described below with reference to the drawings. To clarify the description, the following text and the drawings are abbreviated and simplified as appropriate. The same elements in the drawings are denoted by the same reference sign, and overlapping description thereof is omitted as necessary.

Figure 3:
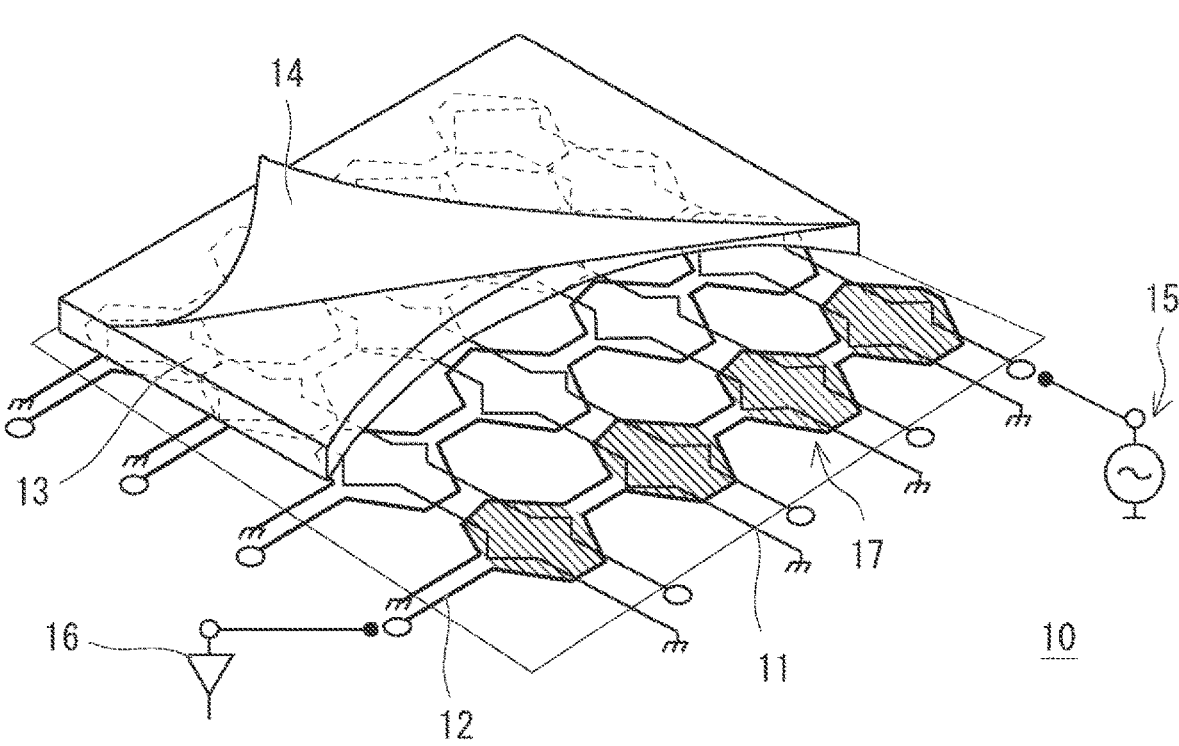
FIG. 3 is a view illustrating a schematic configuration of the load distribution sensor.

The embodiment relates to an inspection device for an electromagnetic-induction load distribution sensor. First, a schematic configuration of the load distribution sensor will be described with reference to FIG. 3. FIG. 3 is a view illustrating the schematic configuration of the load distribution sensor. In FIG. 3, the laminated structure of the load distribution sensor described in JP 2009-63526 A is shown as partially exploded.

As shown in FIG. 3, a load distribution sensor 10 includes driving-side loop electrodes 11, detection-side loop electrodes 12, an intermediate layer 13, a conductive sheet 14, a driving unit 15, and a detection unit 16. The plurality of driving-side loop electrodes 11 is disposed parallel to one another in a first surface. The plurality of detection-side loop electrodes 12 is disposed parallel to one another in a second surface lying above the first surface and parallel to the first surface. The detection-side loop electrodes 12 are orthogonal to each of the driving-side loop electrodes 11.

The driving-side loop electrodes 11 and the detection-side loop electrodes 12 are disposed, for example, on opposite surfaces of a substrate (not shown). In the example shown in FIG. 3, the driving-side loop electrodes 11 are disposed on a back surface of the substrate and the detection-side loop electrodes 12 are disposed on a front surface of the substrate, but these loop electrodes may be disposed the other way around. Further, the driving-side loop electrodes 11 and the detection-side loop electrodes 12 are not limited to the example of being respectively disposed on both surfaces of one substrate. For example, two substrates in which the driving-side loop electrodes 11 and the detection-side loop electrodes 12 are respectively formed may be laminated, or these loop electrodes may be disposed by aerial wiring etc. without using a substrate.

In each of the driving-side loop electrodes 11 and the detection-side loop electrodes 12, coiled patterns are formed so as to align with positions of intersection between these loop electrodes. These coiled patterns are configured to be electromagnetically coupled together, and electromagnetic coupling parts 17 are formed. The electromagnetic coupling parts 17 are disposed in a matrix form within a measurement field of the load distribution sensor 10. For the configuration of the electromagnetic coupling parts, various conventional configurations can be adopted.

On the detection-side loop electrodes 12, the conductive sheet 14 is disposed. The conductive sheet 14 is a film having conductivity, and is formed by, for example, an aluminum foil, a copper foil, etc. As the conductive sheet 14, for example, an aluminum foil with a thickness of 0.1 to 0.2 mm can be used. The conductive sheet 14 is provided over substantially an entire surface of the measurement field of the load distribution sensor 10.

While this is not shown here, a protective plate intended to be directly stepped on during load measurement is provided on the conductive sheet 14 over substantially an entire surface thereof. As the material of such a protective plate, for example, a waterproof sheet, such as a tarpaulin, can be used. A tarpaulin is a composite sheet in which a fiber cloth is sandwiched between soft synthetic-resin films. Alternatively, the protective plate may be formed by an acrylic plate, a polycarbonate plate, etc.

Between the detection-side loop electrodes 12 and the conductive sheet 14, the intermediate layer 13 is disposed. In the case where the driving-side loop electrodes 11 are provided on the front surface of the substrate, the intermediate layer 13 is disposed between the driving-side loop electrodes 11 and the conductive sheet 14. The intermediate layer 13 is a cushion material that deforms according to a pressing force. As the intermediate layer 13, an insulating material that does not affect electromagnetic coupling, for example, urethane foam is used.

The driving unit 15 is connected to the driving-side loop electrodes 11, and the detection unit 16 is connected to the detection-side loop electrodes 12. The driving unit 15 sequentially drives the plurality of driving-side loop electrodes 11 by an alternating current. The detection unit 16 sequentially detects a change in the degree of electromagnetic coupling at the electromagnetic coupling parts 17. For the driving unit 15 and the detection unit 16, various conventional configurations can be adopted.

In such a load distribution sensor 10, when the driving-side loop electrodes 11 are driven, an alternating electromotive force is induced in the detection-side loop electrodes 12 by electromagnetic coupling at the electromagnetic coupling parts 17. The magnitude of this electromotive force varies depending on the degree of electromagnetic coupling. The degree of electromagnetic coupling varies depending on the distance between the electromagnetic coupling parts 17 and the conductive sheet 14.

When a load is applied to the conductive sheet 14 and the conductive sheet 14 approaches the electromagnetic coupling parts 17, a current detected from the detection-side loop electrodes 12 varies. The load distribution sensor 10 detects a load value and its position by sequentially detecting the current from the plurality of detection-side loop electrodes 12.

In this way, in the load distribution sensor 10, measurement of a load is conducted at the electromagnetic coupling parts 17 between the driving-side loop electrodes 11 and the detection-side loop electrodes 12. Thus, the measurement field of the load distribution sensor 10 is demarcated by the driving-side loop electrodes 11 and the detection-side loop electrodes 12.

In such a load distribution sensor 10, if the conductive sheet 14 fractures due to fatigue fracture or the like, a value different from a value that should be detected under normal conditions is output. The inspection device for the load distribution sensor 10 according to the embodiment detects a site of fracture in the conductive sheet 14.

FIG. 1 is a view illustrating the inspection device for the load distribution sensor 10 according to the embodiment. In FIG. 1, an example in which the size of the measurement field of the load distribution sensor 10 is 590 mm wide and 1600 mm long is shown. As one example, the driving unit 15 and the detection unit 16 are collectively provided near a center of one long side of the load distribution sensor 10. These sizes, shapes, arrangement positions, etc. are not limited to the examples shown in the drawing.

A conductive member 21 is disposed on the load distribution sensor 10. The conductive member 21 is disposed on the conductive sheet 14 over a predetermined area so as to cover the electromagnetic coupling parts 17 between the driving-side loop electrodes 11 and the detection-side loop electrodes 12. In the example shown in FIG. 1, the conductive member 21 having a size of 500 mm wide and 500 mm long is used.

The conductive member 21 has a lower resistance value than the conductive sheet 14. For example, in the case where the conductive sheet 14 is formed by an aluminum foil with a thickness of 0.1 to 0.2 mm, a metal plate made of silver, gold, copper, etc. that has the same thickness and a lower resistance value than aluminum can be used as the conductive member 21.

It is also possible to make the resistance value of the conductive member 21 lower than that of the conductive sheet 14 by making the thickness of the conductive member 21 thicker than the thickness of the conductive sheet 14 while using the same material as the conductive sheet 14 for the material of the conductive member 21. For example, in the case where the conductive sheet 14 is formed by an aluminum foil with a thickness of 0.1 to 0.2 mm, a metal plate made of aluminum that is about 1 to 5 mm thick and thicker than the conductive sheet 14 can be used as the conductive member 21.

Having a lower resistance value than the conductive sheet 14, the conductive member 21 is more prone to generation of eddy currents due to electromagnetic induction than the conductive sheet 14 is. Therefore, when the conductive member 21 is disposed so as to cover the conductive sheet 14, an eddy current occurring in the conductive member 21 at a site of fracture in the conductive sheet 14 due to an induction field resulting from passing an alternating current to the coiled patterns at the electromagnetic coupling parts 17 becomes higher than an eddy current occurring in the conductive sheet 14 at a site where the conductive sheet 14 is not fractured.

Due to this difference in the magnitude of eddy currents, the value of the alternating electromotive force induced in the detection-side loop electrode 12 at the site of fracture in the conductive sheet 14 becomes larger than at a site without fracture. Accordingly, at the site of fracture in the conductive sheet 14, a detection value detected by the detection unit 16 becomes larger than at a site where the conductive sheet 14 is not fractured. Thus, the detection unit 16 serves also a function as a detection unit that detects a signal due to electromagnetic coupling of the conductive member 21 in a inspection device 20.

Here, an inspection method for the load distribution sensor 10 according to the embodiment will be described. This inspection method includes a step of disposing the conductive member 21 having a lower resistance value than the conductive sheet 14 onto the conductive sheet 14 so as to cover the electromagnetic coupling parts 17 between the driving-side loop electrodes 11 and the detection-side loop electrodes 12, and a step of detecting a signal due to electromagnetic coupling of the conductive member 21 by the detection unit 16.

Thus, in the embodiment, instead of conducting an inspection by actually applying a load to the load distribution sensor 10, an inspection for determining the site of fracture in the conductive sheet 14 can be conducted by using a change in the detection value due to electromagnetic induction of the conductive member 21. By disposing the conductive member 21 so as to cover the load distribution sensor 10 and observing a change in the detection value output from the detection unit 16, the inspection can be conducted simply and accurately even when the site of fracture in the conductive sheet 14 is minute.

In the embodiment, the inspection of the conductive sheet 14 over the entire surface of the measurement field of the load distribution sensor 10 is executed by sliding the conductive member 21 having a size of 500 mm wide and 500 mm long crisscross over the measurement field. Thus, a site of fracture in the conductive sheet 14 in substantially the entire surface of the measurement field of the load distribution sensor 10 can be determined in a short time.

The size of the conductive member 21 is not particularly limited. For example, it is also possible to use a conductive member 21 substantially equal in size to the measurement field demarcated by the driving-side loop electrodes 11 and the detection-side loop electrodes 12 and thereby inspect the entire surface of the measurement field at once.

Or the conductive member 21 may have an area smaller than the measurement field. In the inspection device 20, since the conductive sheet 14 is inspected for a site of fracture using a change in the detection value due to electromagnetic induction of the conductive member 21, the conductive member 21 should at least cover the conductive sheet 14 over a predetermined area so as to cover a plurality of adjacent electromagnetic coupling parts 17. Further, a band-shaped conductive member 21 having a length equal to the length of the width of the measurement field of the load distribution sensor 10 may be slid in one direction from one end toward the other end of the load distribution sensor 10.

The shape of the conductive member 21 is not limited to a plate shape. The shape of the conductive member 21 may be a columnar shape, a prismatic shape, etc. as long as the conductive member 21 covers the conductive sheet 14 over a predetermined area to allow measurement of a change in the detection value due to electromagnetic induction of the conductive member 21. In this case, the conductive member 21 can be moved over the load distribution sensor 10 by being rotated in a circumferential direction.

The inspection device 20 may include a moving mechanism for sliding the conductive member 21 over the measurement field of the load distribution sensor 10. The specific structure of the moving mechanism is not particularly limited; for example, the moving mechanism may be manually moved by operation of an operator, or may elastically apply a force using a spring etc., or may be actuated by a predetermined actuator.

Figure 2:
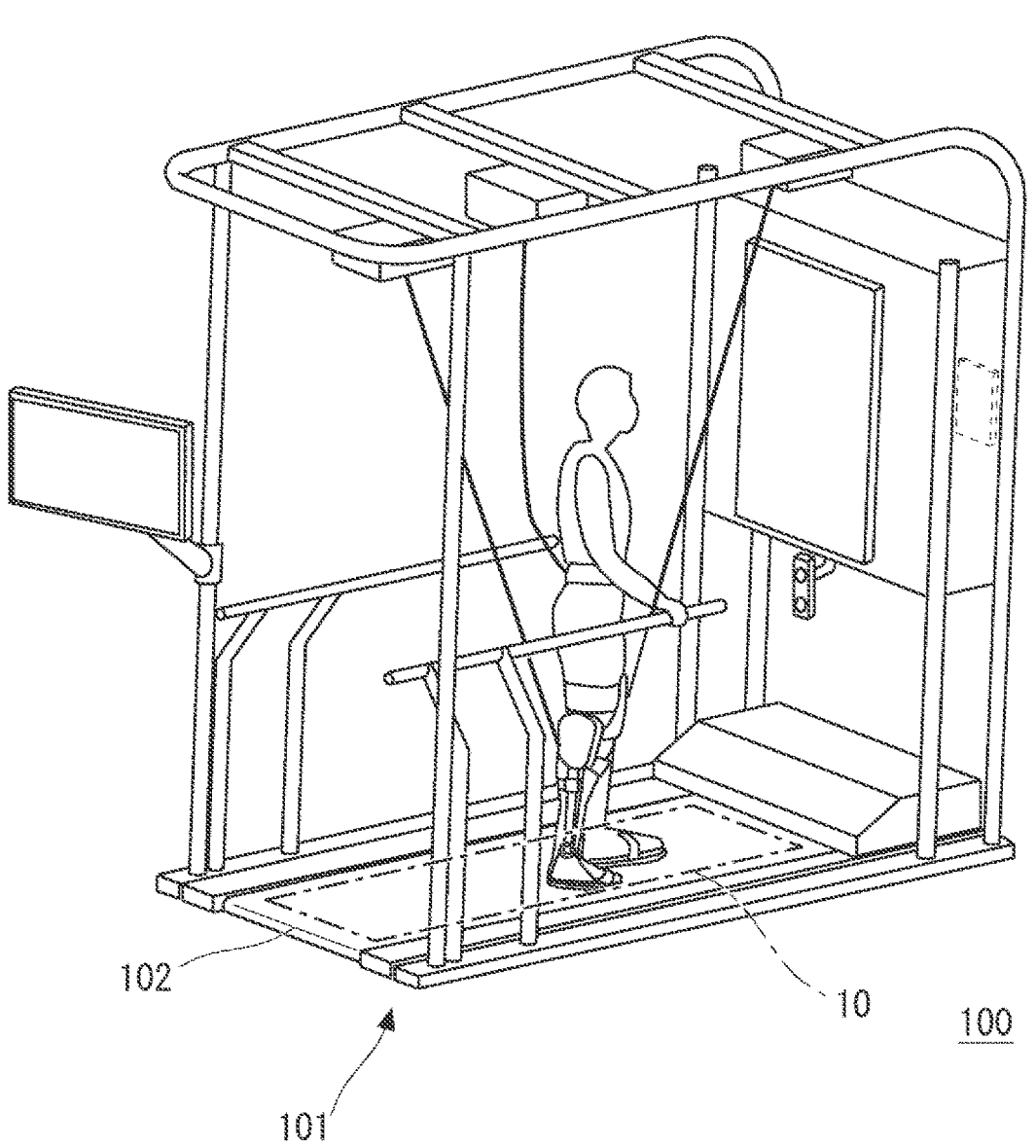
FIG. 2 is a view showing an example in which the load distribution sensor is applied to a treadmill.

The above-described load distribution sensor 10 is applied to a treadmill 101 of a gait training device 100. FIG. 2 is a view showing an example in which the load distribution sensor 10 is applied to the treadmill 101. The treadmill 101 is a device that prompts a trainee to walk.

The treadmill 101 includes pulleys and a motor (not shown) other than a ring-shaped belt 102. As the pulleys are rotated by the motor, the ring-shaped belt 102 is rotated. The trainee who undergoes gait training rides the belt 102 and performs a walking motion in accordance with movement of the belt 102. The load distribution sensor 10 is disposed under the belt 102. The load distribution sensor 10 detects a distribution of a load received from the foot of the trainee.

When conducting an inspection of the conductive sheet 14 of such a load distribution sensor 10, the conductive member 21 can be disposed on the belt 102 so as to cover the conductive sheet 14. Thus, it is also possible to conduct an inspection of the conductive sheet 14 in a state where the load distribution sensor 10 is incorporated in the gait training device 100 by observing a change in the detection value due to electromagnetic induction of the conductive member 21.

By driving the belt 102, the conductive member 21 disposed on the belt 102 can be moved over the load distribution sensor 10 along with the belt 102. In this case, there is no need to separately provide a moving mechanism for sliding the conductive member 21.

The present disclosure is not limited to the above-described embodiment but can be changed as appropriate within such a range that no departure is made from the gist thereof.

What is claimed is:

1. An inspection device for a load distribution sensor including a plurality of first loop electrodes that is disposed parallel to one another in a first surface, a plurality of second loop electrodes that is disposed parallel to one another in a direction orthogonal to the first loop electrodes in a second surface lying above the first surface and parallel to the first surface, and a conductive sheet that is provided on the second surface through an intermediate layer that deforms according to a pressing force, the load distribution sensor being configured to drive either the first loop electrodes or the second loop electrodes and detect a signal due to electromagnetic coupling from the other electrodes, the inspection device comprising:

a conductive member that has a lower resistance value than the conductive sheet and is disposed on the conductive sheet so as to cover an electromagnetic coupling part between the first loop electrodes and the second loop electrodes; and a detection unit that detects a signal due to electromagnetic coupling of the conductive member.

2. The inspection device for a load distribution sensor according to claim 1, wherein the conductive member covers the conductive sheet over a predetermined area.

3. The inspection device for a load distribution sensor according to claim 1, wherein the conductive member is a conductive member having an area substantially equal to or smaller than a measurement field of the load distribution sensor that is demarcated by the first loop electrodes and the second loop electrodes.

4. The inspection device for a load distribution sensor according to claim 1, wherein:

the conductive member is a conductive member having an area smaller than a measurement field of the load distribution sensor that is demarcated by the first loop electrodes and the second loop electrodes; and the inspection device further includes a moving mechanism that slides the conductive member over the measurement field.

5. The inspection device for a load distribution sensor according to claim 1, wherein the conductive member is made of the same material as the conductive sheet and thicker than the conductive sheet.

6. The inspection device for a load distribution sensor according to claim 1, wherein the conductive member is made of a material having a lower resistance value than the conductive sheet.

7. An inspection method for a load distribution sensor including a plurality of first loop electrodes that is disposed parallel to one another in a first surface, a plurality of second loop electrodes that is disposed parallel to one another in a direction orthogonal to the first loop electrodes in a second surface lying above the first surface and parallel to the first surface, and a conductive sheet that is provided on the second surface through an intermediate layer that deforms according to a pressing force, the load distribution sensor being configured to drive either the first loop electrodes or the second loop electrodes and detect a signal due to electromagnetic coupling from the other electrodes, the inspection method comprising the steps of:

disposing a conductive member having a lower resistance value than the conductive sheet onto the conductive sheet so as to cover an electromagnetic coupling part between the first loop electrodes and the second loop electrodes; and detecting a signal due to electromagnetic coupling of the conductive member.

* * * * *